(12) United States Patent
Jeng et al.

(10) Patent No.: US 8,043,414 B2
(45) Date of Patent: Oct. 25, 2011

(54) METHOD AND APPARATUS FOR DESORPTION AND DEHUMIDIFIER USING THE SAME

(75) Inventors: Ming-Shan Jeng, Taipei County (TW); Ming-Shiann Shih, Taipei County (TW); Jau-Chyn Huang, Hsinchu (TW); Yu-Li Lin, Chiayi (TW); Ya-Wen Chou, Tainan (TW); Ting-Wei Huang, Hsinchu (TW); Yu-Ming Chang, Kaohsiung County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 298 days.

(21) Appl. No.: 12/404,548

(22) Filed: Mar. 16, 2009

(65) Prior Publication Data

US 2009/0229461 A1   Sep. 17, 2009

(30) Foreign Application Priority Data

Mar. 17, 2008 (TW) ................. 97109268 A
Jan. 12, 2009 (TW) ................. 98100903 A (51) Int. Cl.
*B01D 53/06* (2006.01)
*B01D 53/26* (2006.01)

(52) U.S. Cl. ............. 95/113; 95/117; 95/148; 96/125; 96/143; 422/186.04

(58) Field of Classification Search ........... 95/113–115, 95/117, 130, 143, 148; 96/125, 134, 135, 96/143, 146; 62/600, 617, 640, 271; 422/186.04

See application file for complete search history.

(56) References Cited

U.S. PATENT DOCUMENTS

| | | | | |
|---|---|---|---|---|
| 5,385,603 A | * | 1/1995 | Sienack | 96/125 |
| 5,505,825 A | * | 4/1996 | Gold et al. | 95/126 |
| 5,827,355 A | * | 10/1998 | Wilson et al. | 95/114 |
| 5,912,423 A | * | 6/1999 | Doughty et al. | 95/107 |
| 6,454,834 B1 | * | 9/2002 | Livingstone et al. | 95/11 |
| 7,251,945 B2 | * | 8/2007 | Tongue | 62/93 |
| 2007/0028769 A1 | * | 2/2007 | Eplee et al. | 95/113 |
| 2010/0175557 A1 | * | 7/2010 | Shih et al. | 96/146 |

FOREIGN PATENT DOCUMENTS

| | | |
|---|---|---|
| JP | 2001-179037 | 7/2001 |
| JP | 2001179037 | 7/2001 |
| JP | 2005134097 | 5/2005 |
| JP | 2005207638 | 8/2005 |
| JP | 2007181804 | 7/2007 |
| JP | 2008055287 | 3/2008 |
| TW | 285677 | 1/2006 |

OTHER PUBLICATIONS

Machine generated English translation of JP 2001-179037A, published Jul. 2001.*

* cited by examiner

*Primary Examiner* — Frank Lawrence, Jr.
(74) *Attorney, Agent, or Firm* — WPAT, PC; Justin King (57) ABSTRACT

A method and an apparatus for desorption and a dehumidifier are provided in the present invention, in which an electrical potential is applied to electrodes disposed on both ends of an absorbing material so as to desorb the substances absorbed within the absorbing material whereby the absorbing material is capable of being maintained for cycling the absorbing operation. By means of the method and the apparatus of the present invention, the desorbing efficiency can be enhanced and the energy consumption can be reduced during desorption.

37 Claims, 11 Drawing Sheets

METHOD AND APPARATUS FOR DESORPTION AND DEHUMIDIFIER USING THE SAME

FIELD OF THE INVENTION

The present invention generally relates to a dehumidifying technology and, more particularly, to a method and an apparatus for desorption and a dehumidifier using the method and the apparatus wherein a voltage is applied across electrodes on both ends of an absorbing material for desorption.

BACKGROUND OF THE INVENTION

Conventionally, the household dehumidifier uses a refrigerant compressor to condense the moisture in the air to achieve dehumidification. However, the use of refrigerant results in problems such as ozone layer depletion. Therefore, there is need in developing a novel dehumidification technique without using refrigerant.

In rotary desiccant dehumidification, the refrigerant compressor is not required; instead, an absorbing material is used to absorb the moisture in the air and then electrical-thermal heating is used to heat up the gas flow through a regenerating side of the absorbing material to desorb the moisture. The high-temperature and high-moisture gas on the regenerating side is introduced into a heat exchanger to be condensed and the condensed moisture is then collected by a water collector to achieve household dehumidification. Since dehumidification achieved by the rotary dehumidifier using an absorbing material is temperature and humidity independent and refrigerant free, it is advantageous in low noise and low cost without using the compressor.

Figure 1:
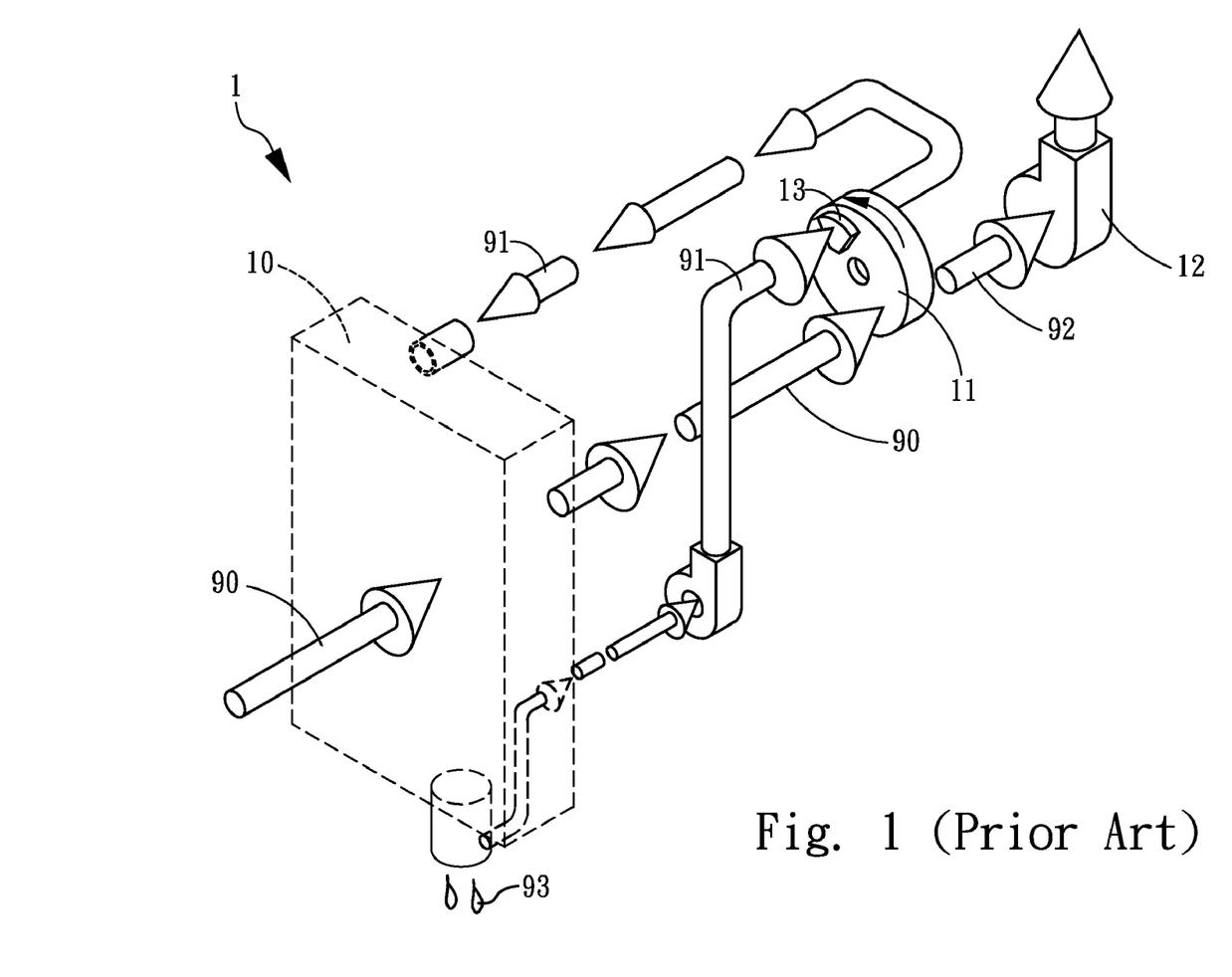
FIG. 1 is a 3-D exploded view of a conventional dehumidifier using electrical-thermal desorption.

In the rotary desiccant dehumidifier 1, as shown in FIG. 1, a moist gas flow 90 flows through a heat exchanger 10 into an absorbing material 11 so that the absorbing material 11 is capable of absorbing the moisture in the gas flow 90. The dehumidified gas flow 92 is released by a dehumidifying blower 12 to achieve dehumidification. On the other hand, an electric heater 13 heats up the temperature of a circulating gas flow 91. The water molecules in the absorbing material 11 is vaporized and desorbed by the temperature difference between the high-temperature circulating gas flow 91 and the water molecules in the absorbing material 11. Then, the high-temperature high-moisture circulating gas flow 91 enters the heat exchanger 10 to perform heat transfer with the low-temperature moist gas flow 90 at the entrance of the dehumidifier 1. The high-temperature high-moisture gas in the heat exchanger 10 can be condensed into liquid-phase water 93, which is then collected and exhausted. The circulating gas flow 91 returns to the electric heater 13 to repeat the aforesaid processes to complete moisture desorption. The absorbing material 11, the electric heater 13 and the heat exchanger 10 are integrated to achieve the dehumidification as a dehumidifier 1. In conventional rotary desiccant dehumidification, an electric heater is used to heat up the gas flow on the regenerating side to increase the temperature of the regenerating air. The thermal desorption mechanism comprises two approaches. One is vaporization by heat exchange of the gas flow, wherein a temperature gradient occurs as the circulating gas flow is heated up and the moisture is vaporized to desorb from the dehumidifying structure in the absorbing material by the energy generated during heat exchange. However, this approach costs high power consumption to achieve dehumidification because it takes a long time for vaporization to generate high-temperature gas required during moisture desorption. The other approach is vaporization by thermal radiation, wherein high-temperature gas is obtained by conducting a current flowing through a heating wire in the heater. Thermal radiation enables the water molecules in the absorbing material to receive the heat to be vaporized to desorb from the absorbing material. Since the radiated heat is proportional to the surface temperature to the power of four and the surface temperature of the electric heater is higher than 400° C., the radiated heat is very high. Therefore, the moisture desorption effect is much more important than vaporization by heat exchange of the gas flow. Accordingly, in the aforesaid two approaches, conventional desorption approaches by heating up the circulating gas flow or thermally radiating the water molecules to achieve desorption inevitably lead to high power consumption since the radiated heat is mostly absorbed by the absorbing material. Moreover, the radiated heat increases the surface temperature of the absorbing material, which adversely affects the absorption of water molecules by the desiccative to reduce the dehumidifying performance. Therefore, in a rotary dehumidifier, the power consumption is high and dehumidification efficiency is reduced.

Figure 2:
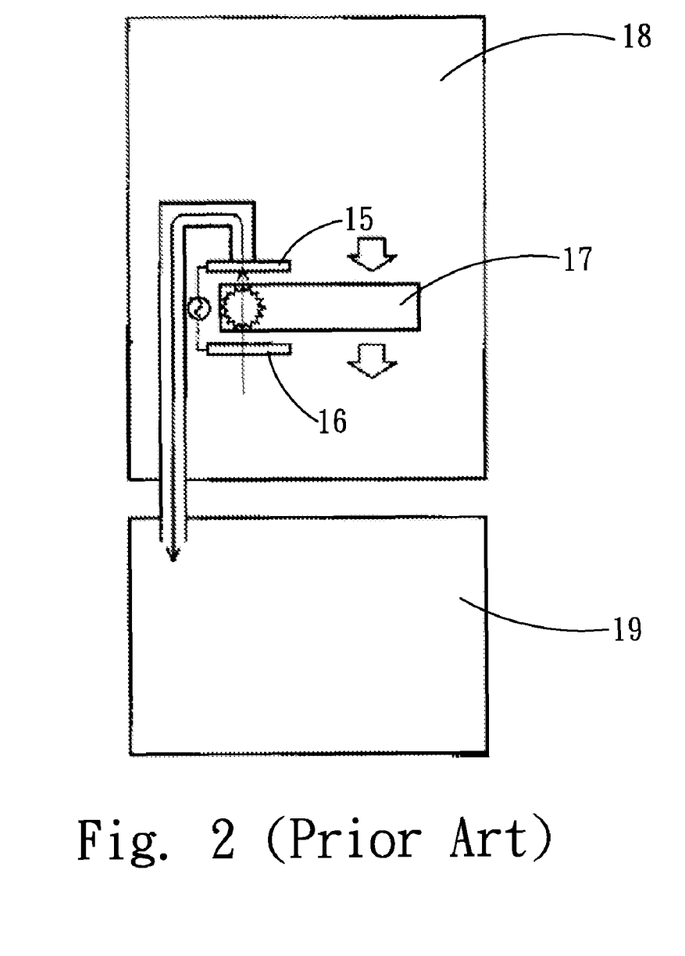
FIG. 2 is a schematic diagram of a conventional plasma dehumidifier/humidifier.

To overcome this drawback, please refer to FIG. 2, which is a schematic diagram of a conventional plasma dehumidifier/humidifier disclosed in Japanese Patent Laid-Open Publication No. 2001-179037. In FIG. 2, two electrodes 15 and 16 disposed on both sides of a dehumidifying unit 17 are used to generate plasma to desorb the moisture absorbed by the dehumidifying unit 17. Even though, in this pant, a plasma-enhanced moisture desorption technique is disclosed to reduce power consumption, both a dehumidifier and a humidifier are required in the chambers 18 and 19 because it is based on an open gas flow design. Therefore, this technique is used in a large-size open gas flow system. Moreover, the electrodes 15 and 16 are thermally activated, wherein a low voltage (5 to 10 volts) is used to activate the electrodes to generate plasma.

SUMMARY OF THE INVENTION

The present invention provides a dehumidifier using charged particles to perform water desorption to enhance water desorption efficiency of a rotator, reduce power dissipation of a heater and improve dehumidification efficiency of a rotary dehumidifier. Since the power dissipation is reduced, the dehumidifier of the present invention can be used to replace the conventional high power-consumption electrical-thermal dehumidification system for water desorption.

The first present invention provides an apparatus for a dehumidifier, using a high voltage to discharge the electrodes and ionize the gas flow through the regenerator to generate charged particles, which enable water molecules to be easily desorbed so that the desiccative in the dehumidifier exhibits sufficient desorptivity at a low temperature or without heating up the gas.

The second present invention provides a low power consumption desorption method, conducting a current flowing through an absorbing material to desorb a substance absorbed by the absorbing material to reduce power consumption for desorption and enhance desorption efficiency.

The present invention provides a low power consumption desorption apparatus using electrodes disposed on both ends of an absorbing material so as to conduct a current flowing through the absorbing material to desorb a substance absorbed by the absorbing material. Moreover, a gas flow channel can be provided in a region corresponding to the electrodes so that the gas flow passes through the absorbing material to enhance the desorption rate.

The present invention provides a dehumidifier with minimum waste of energy in heating up water molecules and an absorbing material to significantly reduce power consumption and, hence, thermal loss. Moreover, the absorbing material is less heated so that the dehumidification efficiency of the dehumidifier is improved.

In one embodiment, the present invention provides dehumidifier, comprising:

a condenser, capable of containing a circulating gas flow therein;

a absorbing material, capable of allowing a gas flow to pass through to absorb moisture in the gas flow; and a regenerating portion, being dispose on one side of the absorbing material and being connected to the condenser, wherein the circulating gas flow is ionized by plasma in the regenerating portion so that the ionized circulating gas flow desorbs the moisture in the absorbing material.

In another embodiment, the present invention further provides a regenerator for a dehumidifier, comprising:

a pair of electrodes disposed a distance apart, each of the electrodes comprising a plurality of gas channels; and a pair of insulators, being respectively connected to the pair of electrodes, each of the insulators comprising a plurality of insulating structures, each of the insulating structures corresponding to one of the gas channels respectively.

In one embodiment, the present invention further provides a low power consumption desorption method, comprising steps of:

providing an absorbing material;

providing electrodes on both ends of the absorbing material; and applying a voltage across the electrodes on the both ends of the absorbing material so that the absorbing material is conductive to perform desorption.

In another embodiment, the present invention further provides a low power consumption desorption apparatus, comprising:

an absorbing material capable of absorbing at least a substance;

a pair of electrodes disposed on both ends of the absorbing material; and a voltage supply coupled to the pair of electrodes and providing the pair of electrodes with a voltage so that the absorbing material is conductive to perform desorption.

In another embodiment, the present invention further provides a low power consumption desorption apparatus, comprising:

an absorbing material capable of absorbing at least a substance;

a pair of electrodes disposed on both ends of the absorbing material;

a voltage supply coupled to the pair of electrodes and providing the pair of electrodes with a voltage so that the absorbing material is conductive to perform desorption; and a gas flow channel disposed corresponding to the pair of electrodes.

BRIEF DESCRIPTION OF THE DRAWINGS

The objects, spirits and advantages of the embodiments of the present invention will be readily understood by the accompanying drawings and detailed descriptions, wherein.

DETAILED DESCRIPTION OF THE PREFERRED EMBODIMENT

The present invention can be exemplified but not limited by the preferred embodiments as described hereinafter.

Figure 3:
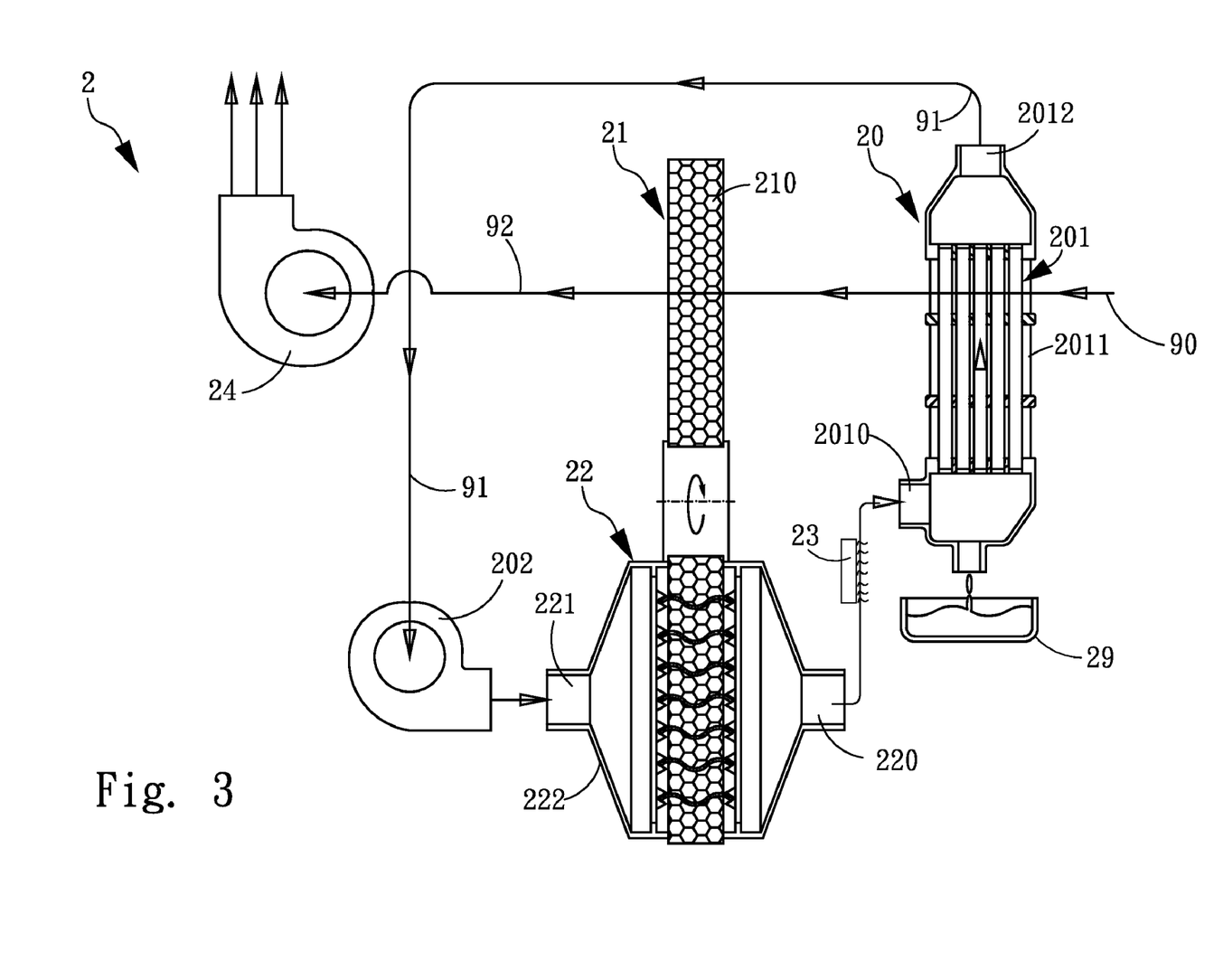
FIG. 3 is a schematic diagram of a first embodiment of a dehumidifier according to the present invention.

Please refer to FIG. 3, which is a schematic diagram of a first embodiment of a dehumidifier according to the present invention. The dehumidifier 2 comprises a condenser 20, an absorbing material 21 and a regenerating portion 22. The condenser 20 comprises a condenser plate 201 and a regenerating blower 202. An inlet 2010 of the condenser plate 201 is channeled with an inlet 220 of the regenerating portion 22 through a pipeline. To simplify FIG. 3, the pipeline is not shown, while those with ordinary skills in the art can understand the present invention. In the present embodiment, the condenser plate 201 comprises a plurality of condenser pipelines 2011, comprising a flowing path for a circulating gas flow 91 to flow therein. Since the condenser plate 201 is provided to enable a gas flow 90 to be dehumidified to pass through so that a heat exchange process is performed between the gas flow 90 and the circulating gas flow 91 in the condenser plate 201, there are interstices between the condenser pipelines 2011 to enable the gas flow 90 to pass through. The condenser plate 201 is well-known to those with ordinary skills in the art, and thus the description thereof is not presented. The regenerating blower 202 is coupled to the inlet 2012 of the condenser plate 201 and the inlet 221 of the regenerating portion 22. The regenerating blower 202 is capable of increasing the pressure of the circulating gas flow 91 to accelerate the circulating gas flow 91.

The absorbing material 21 is capable of allowing the gas flow 90 to pass through. The absorbing material 21 comprises micro-structures 210 therein to absorb moisture in the gas flow 90. In the present embodiment, the absorbing material 21 is a roller capable of rotating. Certainly, the absorbing material 21 is not restricted to a roller in the present invention. The absorbing material 21 is well-known to those with ordinary skills in the art, and thus the description thereof is not presented.

The regenerating portion 22 is dispose on one side of the absorbing material 21. The regenerating portion 22 uses plasma to ionize the circulating gas flow 91 so that the ionized circulating gas flow 91 desorbs the moisture absorbed by the absorbing material 21. In the present embodiment, the regenerating portion 22 comprises a housing 222 capable of allowing the circulating gas flow 91 to pass through. The housing 222 covers part of the absorbing material 21 so that the ionized circulating gas flow 91 in the housing 222 passes through the absorbing material 21 to desorb the moisture in the absorbing material 21.

In order to accelerate the dehumidified gas flow 90 to better control dehumidification, the dehumidifier 2 of present embodiment further comprises a dehumidifying blower 24 capable of exhausting the dehumidified gas flow passing through the absorbing material 21 out of the dehumidifier 2. Moreover, the dehumidifier 2 further comprises a heating unit 23. In the present embodiment, the heating unit 23 is disposed between the inlet 220 of the regenerating portion and the condenser plate 201. The heating unit 23 is capable of providing the circulating gas flow 91 with thermal energy to increase the temperature of the circulating gas flow 91 to further enhance condensation of the desorbed moisture.

Figure 4A:
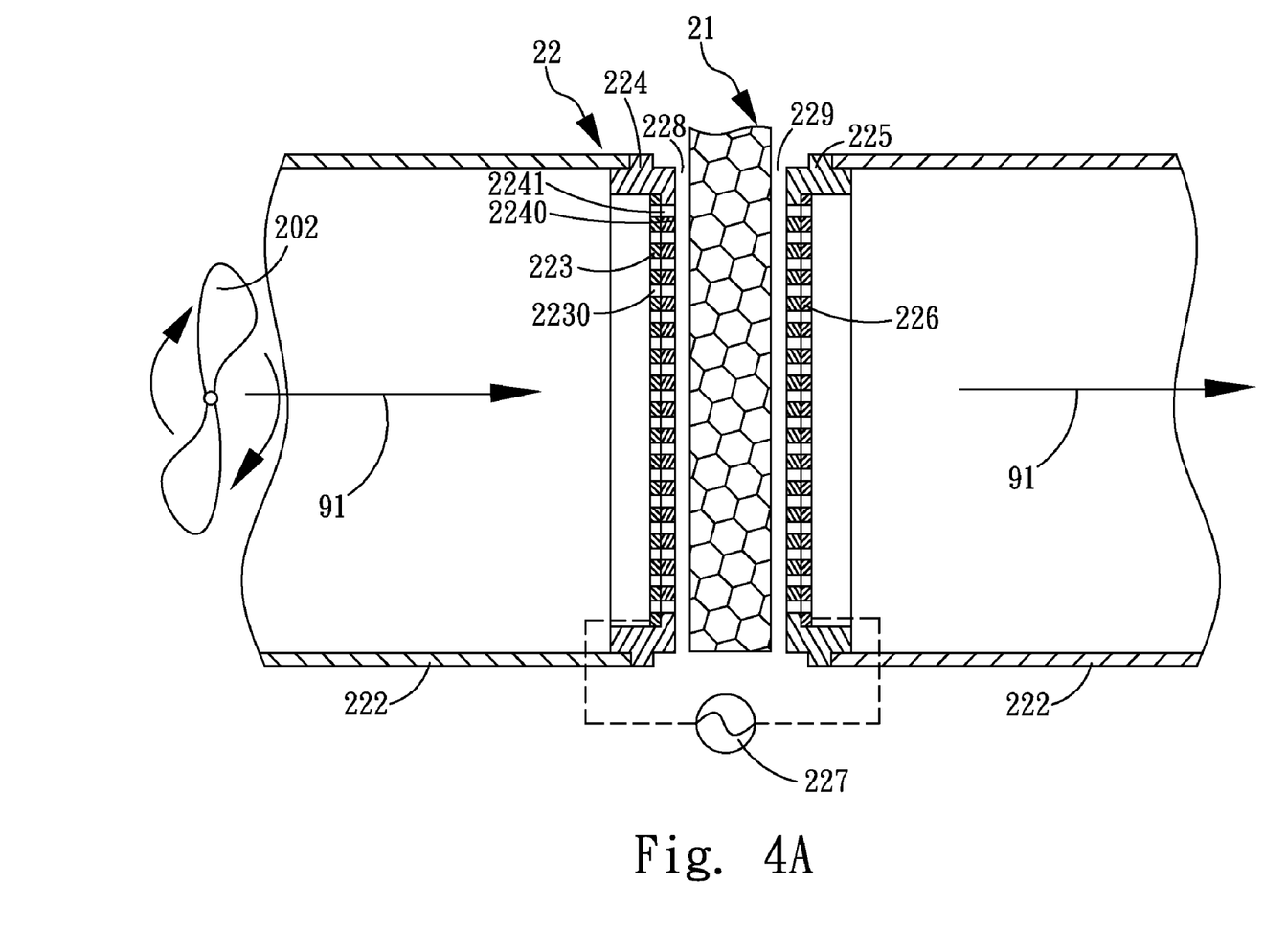
FIG. 4A is a schematic diagram of a regenerating portion according to a first embodiment of the present invention.

Several embodiments of the regenerating portion of the present invention are described hereinafter. Please refer to FIG. 4A, which is a schematic diagram of a regenerating portion according to a first embodiment of the present invention. In the present embodiment, the regenerating portion 22 comprises a pair of electrodes 223 and 226 and a pair of insulators 224 and 225. The pair of electrodes 223 and 226 comprise a conductive material and are disposed respectively on both sides of the absorbing material 21. Each of the electrodes 223 and 226 comprises a plurality of gas channels to allow the circulating gas flow to pass through. The pair of insulators 224 and 225 are connected respectively to the pair of electrodes 223 and 226 to prevent the pair of electrodes 223 and 226 from being short-circuited during discharge. In FIG. 4A, a gap 228/229 is formed between each of the insulators 224 and 225 and the surface of the absorbing material 21. In the present embodiment, the gap 228/229 (wherein discharge takes place) is smaller than 10 mm, preferably within a range from 0.1 to 5 mm, but not limited thereto. The insulators 224 and 225 are connected to the electrodes 223 and 226, respectively, by wrapping the electrodes or contacting the electrode surfaces. Moreover, each of the insulators 224 and 225 comprises a plurality of insulating structures 2240. Each of the insulating structures 2240 corresponds to one of the gas channels respectively.

Figure 4B:
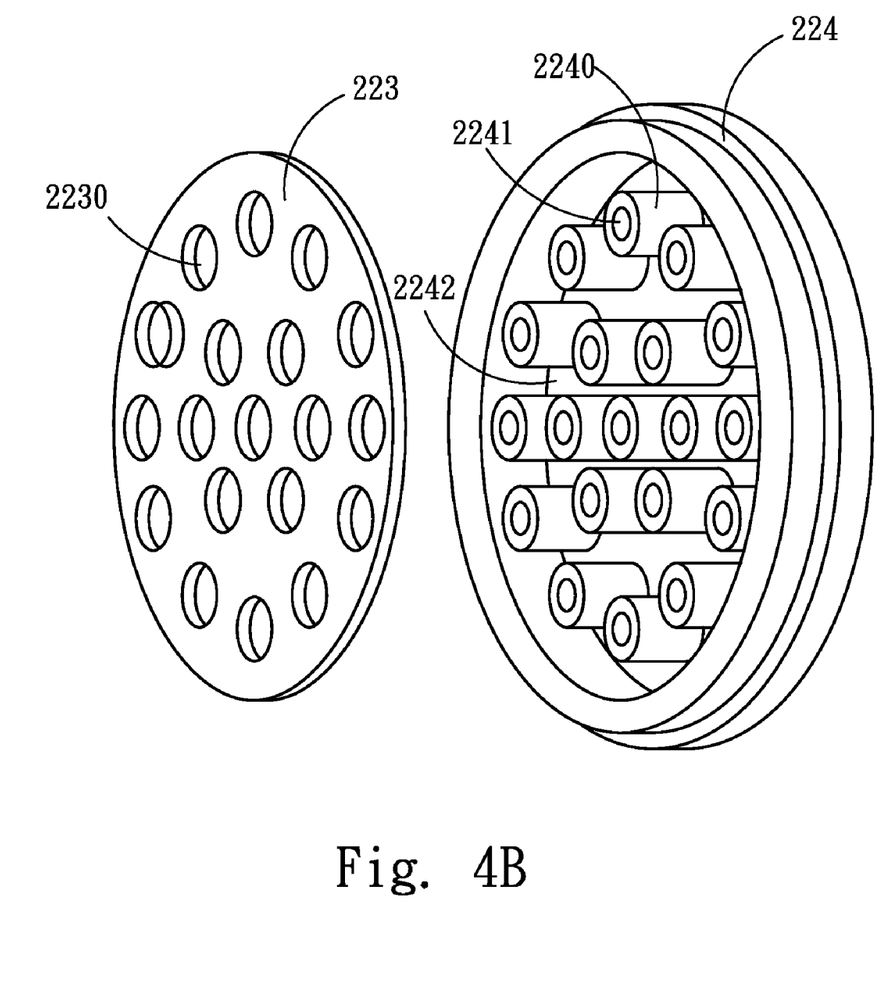
FIG. 4B is a 3-D view of an electrode and an insulator in FIG. 4A.

Please refer to FIG. 4B, which is a 3-D view of an electrode and an insulator in FIG. 4A. In FIG. 4B, the electrode 223 is circular and has a plurality of holes 2230 as a gas flow channel. The diameter of each of the holes 2230 is within a range from 0.5 mm to 8 mm, but not limited thereto.

The dehumidifier of the present invention operates as shown in FIG. 3 and FIG. 4A. The desorbed moisture is carried away from the absorbing material 21 by the circulating gas flow 91 to enter the condenser plate 210 to be condensed. The condensed moisture is then collected by a water collector 29. After the condensed moisture is collected by the water collector 20, the circulating gas flow 91 is driven by the regenerating blower 202 to enter the regenerating portion 22 through the pipeline to repeat the moisture desorption process. In FIG. 3, the gas flow 90 to be dehumidified passes through the condenser plate 201 to perform a heat exchange process with the circulating gas flow 91 in the condenser plate 201. Then the heat-exchanged gas flow 90 is exhausted out of the dehumidifier 2 by the dehumidifying blower 24 after passing through the absorbing material 21. Since the absorbing material 21 comprises dehumidifying structures 210 and a desiccative therein to absorb gas water molecules in the gas flow 90 to generate a dehumidified gas flow 92. The absorbing material 21 with saturatedly absorbed moisture has to be regenerated by desorption before it is capable of absorbing moistures to dehumidify the air.

In the previous embodiment, a current is conducted between the electrodes that do not contact the absorbing material. Alternatively, in the next embodiment, the electrodes are connected with the absorbing material so that a current is conducted between the electrodes to desorb a substance. Please refer to FIG. 5, which is a flowchart of a low power consumption desorption method according to second embodiment of the present invention. In the present embodiment, the method 4 comprises steps as described hereinafter. Firstly, in step 40, an absorbing material is provided. The absorbing material is capable of absorbing organic volatile substances, nitrogen or moistures, but not limited thereto. Generally, the absorbing material is usually used in household dehumidifiers, such as rotary dehumidifier, but not limited thereto. The absorbing material can be made of porous materials such as zeolite, silicone, silica gel, active carbon, carbon nano tubes, metal organic frameworks. Moreover, the absorbing material may also be formed of non-porous materials such as dehydrogenated metal.

Figure 5:
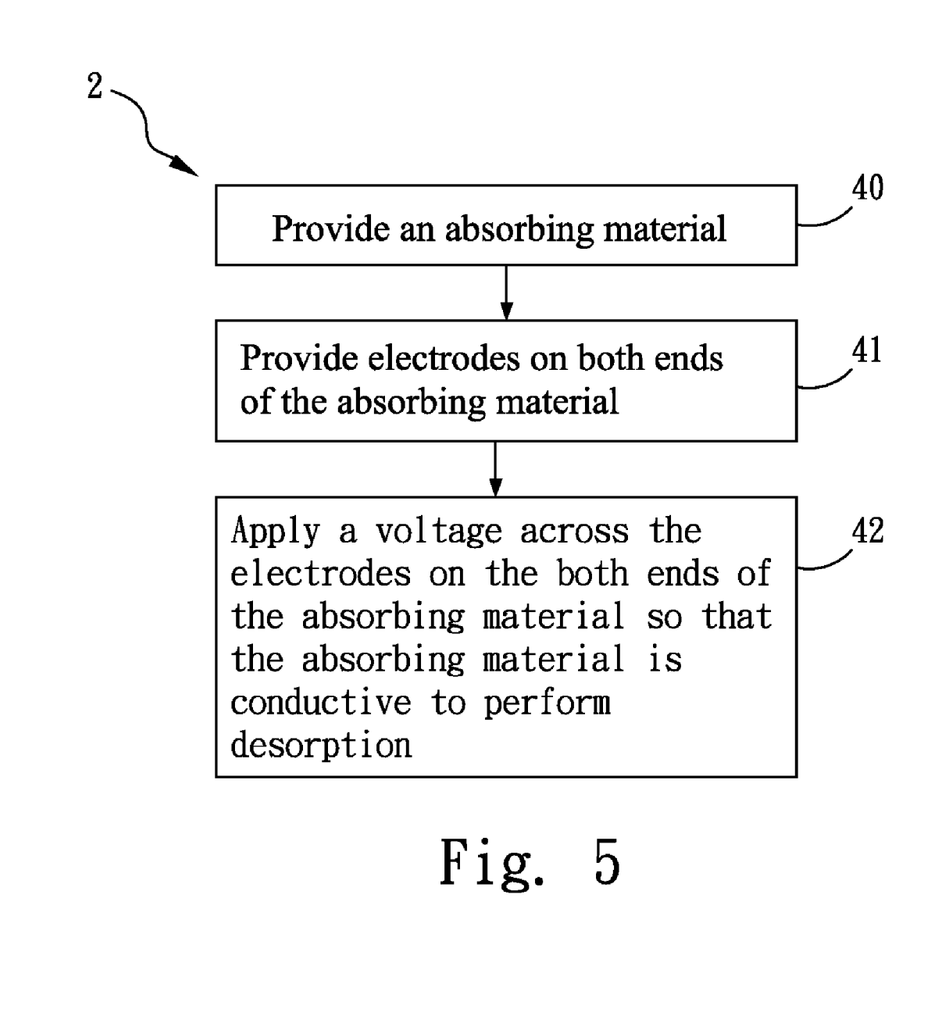
FIG. 5 is a flowchart of a low power consumption desorption method according to a second embodiment of the present invention.

After step 40, step 41 is performed. In step 41, electrodes are provided on both ends of the absorbing material. In step 42, a voltage is applied across the electrodes on the both ends of the absorbing material so that the absorbing material is conductive to perform desorption. In the present embodiment, the applied voltage is an AC voltage or a DC voltage. When the current passes through the absorbing material, the temperature rises to weaken the bond between the absorbed substance and the absorbing material. The current is induced due to ion hopping in the absorbing material, ion/proton transport in the ionized substance or both. If the absorbed substance is water, the water molecules help to increase the conductivity of the ions in the absorbing material. As a result, the heat loss is reduced and the power consumption is reduced because there is no need to heat up the atmosphere. Moreover, in step 42, a gas flow may be applied so that the heat is delivered throughout the desorption region. With the heat delivered by the gas flow, the desorption rate is increased to improve the desorption efficiency of the absorbing material. In one embodiment, the gas flow is heated with higher temperature to improve the desorption efficiency of the absorbing material.

Figure 6:
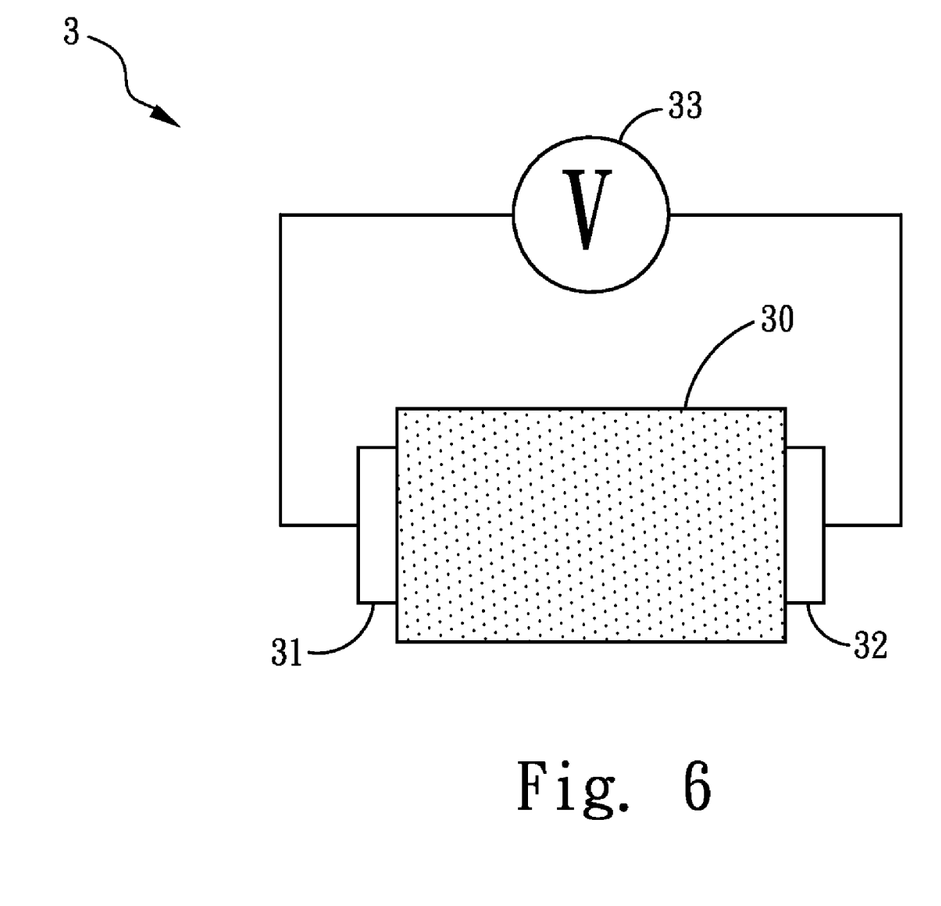
FIG. 6 is a schematic diagram of a second embodiment of a low power consumption desorption apparatus of the present invention.

Please refer to FIG. 6, which is a schematic diagram of a second embodiment of a low power consumption desorption apparatus of the present invention. In the present embodiment, the apparatus 3 comprises an absorbing material 30, a pair of electrodes 31 and 32 and a voltage supply 33. The absorbing material 30 is capable of absorbing at least a substance. The absorbing material 30 and the absorbed substance are as described previously and will not be repeated herein. The pair of electrodes 31 and 32 are connected to the both ends of the absorbing material 30. The voltage supply 33 is coupled to the electrodes 31 and 32 to provide the electrodes 31 and 32 with a voltage. The voltage supply 33 provides an AC voltage or a DC voltage. Since the electrodes 31 and 32 are disposed on the two ends of the absorbing material 30, a current can be induced through the absorbing material 30 to perform desorption.

Taking a dehumidification wheel for example, in order to perform desorption only in some specific region in the absorbing material while remaining absorption in other region when the dehumidification wheel is rotating, the electrodes are further provided with insulators to divide the electrodes into a plurality of regions. Each of the regions is isolated from one another so that only some region of the electrodes is conductive when a voltage is applied to enable the corresponding absorbing material to perform desorption while remaining absorption in other regions.

Figure 7A:
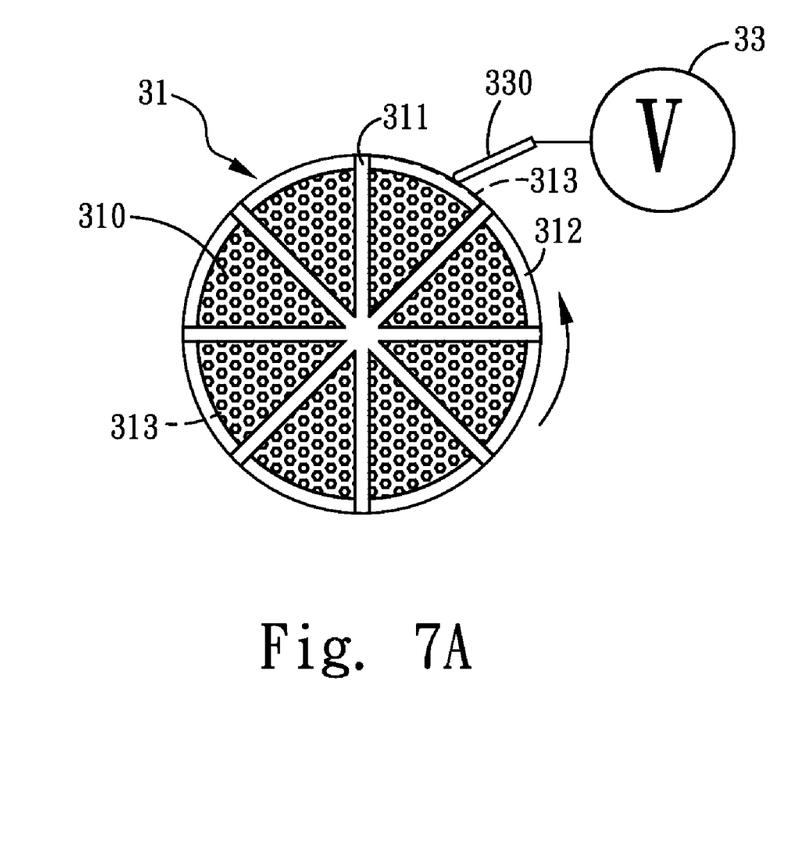
FIG. 7A is a front view of an electrode according to one embodiment of the present invention.

Please refer to FIG. 7A, which is a front view of an electrode according to one embodiment of the present invention. In the present embodiment, taking the electrode 31 for example, the electrode 31 comprises a meshed metal electrode 310 and an insulating frame 311. The meshed metal electrode 310 is made of a conductive material that is not limited. The meshed metal electrode 310 is provided with a metal frame 312 on the fringe so that the meshed metal electrode 310 can be flat and the metal frame 312 functions as a contact for contacting a brush 330 while rotating. The insulating frame 311 is disposed inside the meshed metal electrode 310 so that the meshed metal electrode 310 is divided into a plurality of desorption regions 313. The insulating frame 311 does not only divide the meshed metal electrode 310 into a plurality of conductive regions but also strengthens the structure of the meshed metal electrode 310 and keeps the meshed metal electrode 310 flat. The adjacent desorption regions are insulated from one another due to the insulating frame 311. When the brush 330 contacts the metal frame 312, electric conduction occurs only in the desorption region where the metal frame 312 contacts while the other regions remain absorption.

Figure 7B:
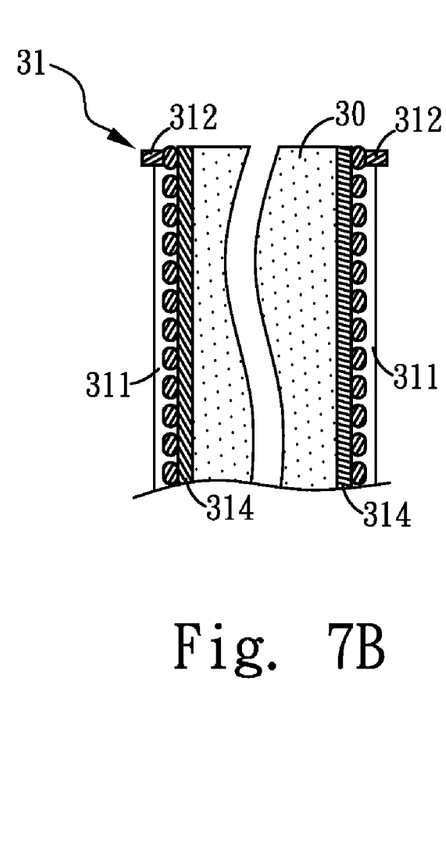
FIG. 7B is a cross-sectional view of an electrode and an absorbing material according to one embodiment of the present invention.
Figure 8:
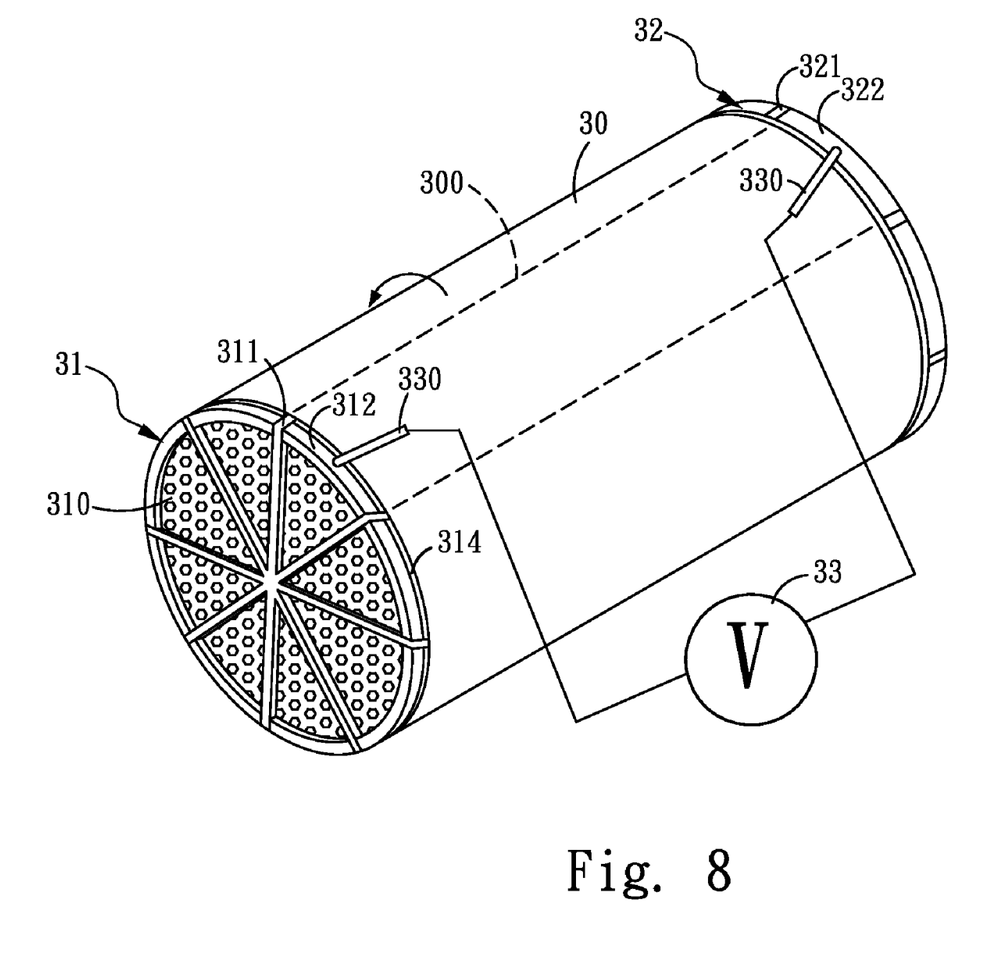
FIG. 8 is a schematic diagram showing the operation of electrodes according to one embodiment of the present invention.
Figure 9:
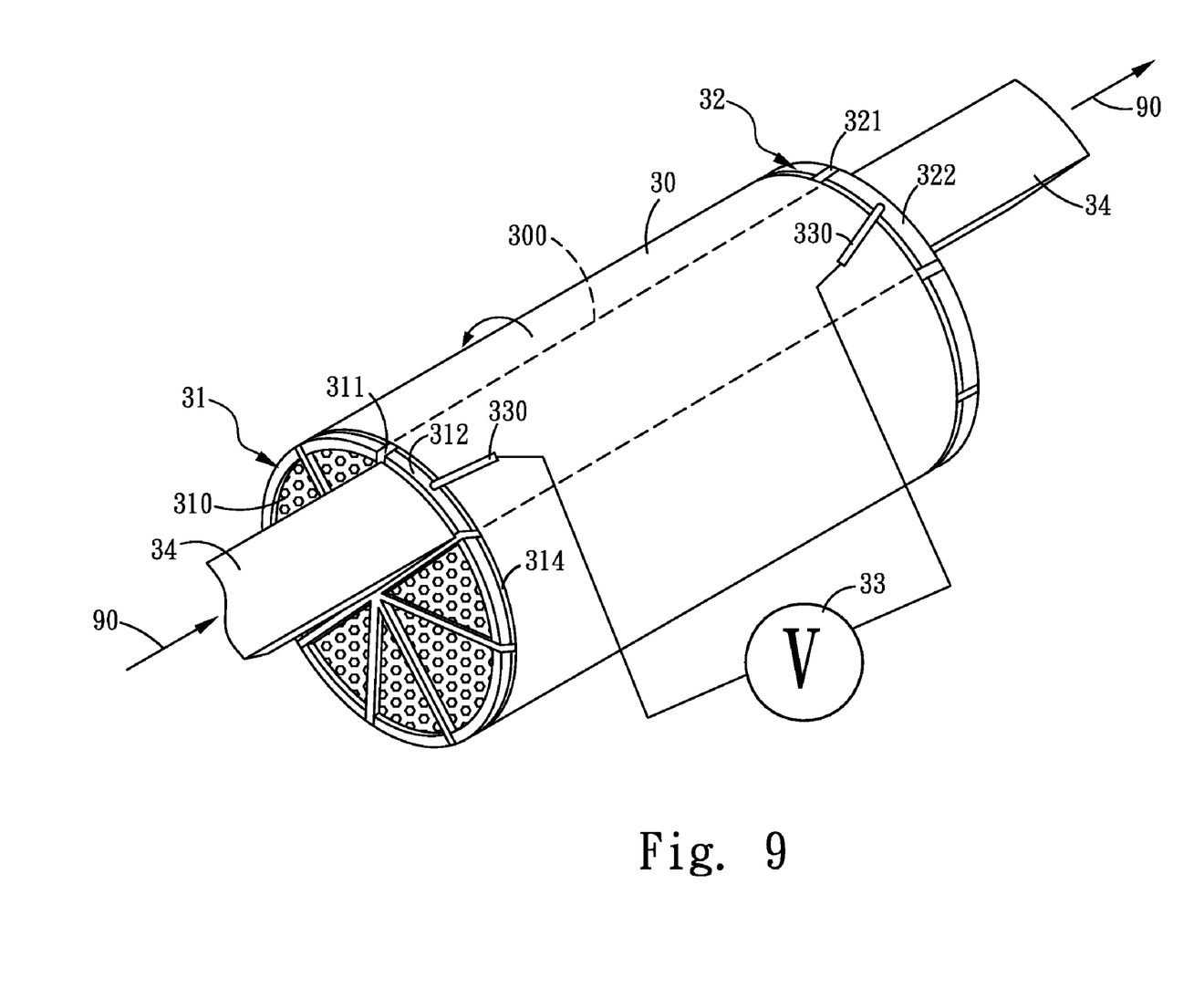
FIG. 9 is a schematic diagram showing the operation of electrodes connected to a gas flow channel according to one embodiment of the present invention.

Please refer to FIG. 7B, which is a cross-sectional view of an electrode and an absorbing material according to one embodiment of the present invention. A conductive layer 314 is provided between the meshed metal electrode 310 and the absorbing material 30 to reduce contact resistance and enable the current to be uniformly distributed. In the present embodiment, the conductive layer 314 comprises a silver paste or other conductive materials. Please refer to FIG. 8, which is a schematic diagram showing the operation of electrodes according to one embodiment of the present invention. The electrodes 31 and 32 are provided on both ends of the absorbing material 30. When the absorbing material 30 rotates and the brush 30 contacts the metal frame 312, the brush 30 contacts corresponding desorption region to cause electric conduction in the desorption region. Since the electrodes 31 and 32 of the present invention are provided with the insulating frames 311 and 321, desorption is only performed in the desorption region where electric conduction takes place because only the desorption region corresponds to the contact when the brush 330 contacts the metal frame 312 and 322 of the electrodes 31 and 32. On the other hand, other regions of the absorbing material 30 remain absorption. In this manner, the absorbing material 30 is capable of performing absorption and desorption at the same time. Referring to FIG. 9, a gas flow channel 34 is provided on both ends of the desorption region corresponding to the brush 330. The gas flow channel 34 is capable of introducing the gas flow 90 into the corresponding conductive desorption region and exhausting the desorbed substance to enhance the desorption rate. To further improve the desorption rate, the gas flow 90 can be heated up to a higher temperature to speed up desorption.

Figure 10:
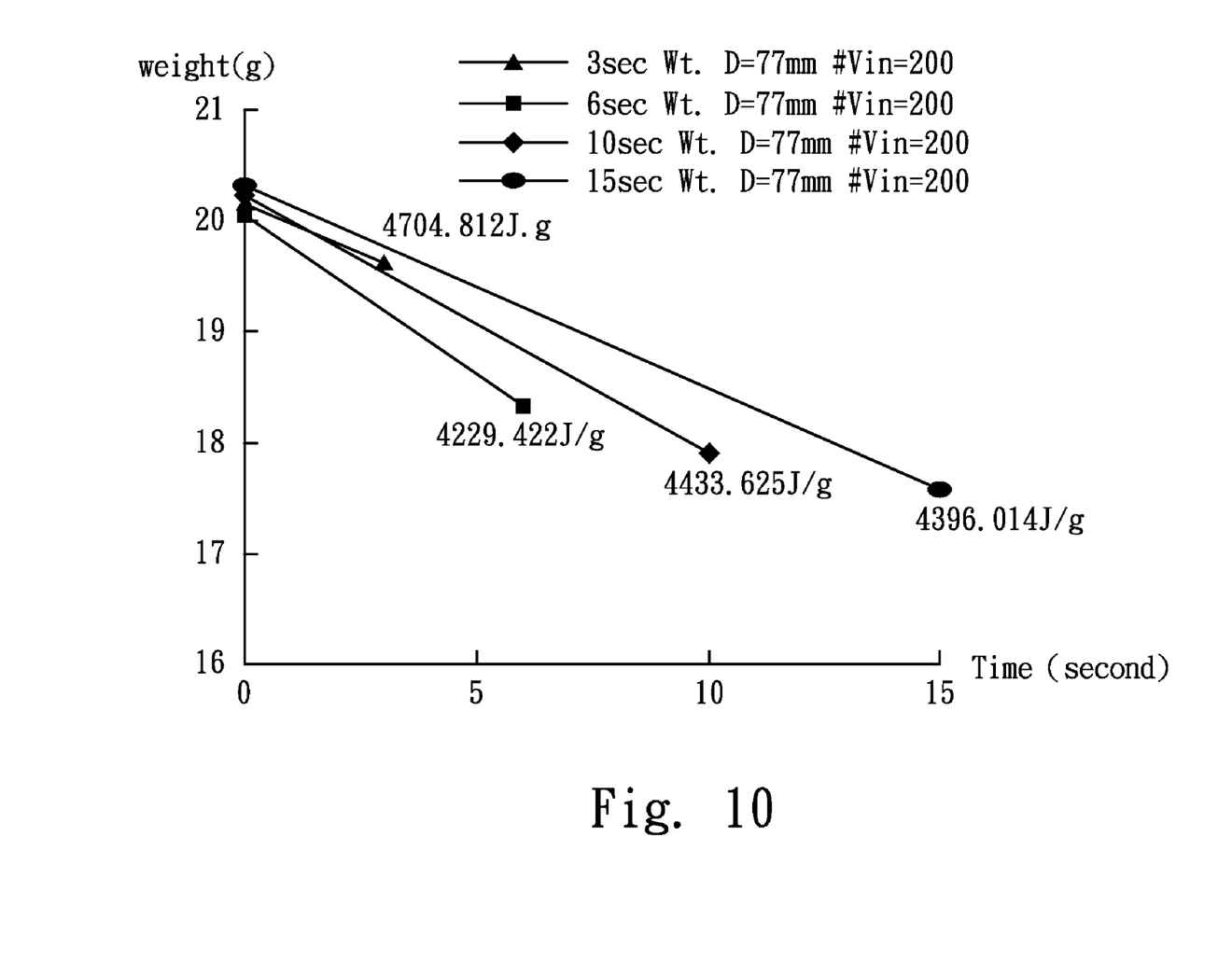
FIG. 10 shows the testing result of a dehumidifier.

The aforementioned desorption method can be used with any conductive absorbing material and absorbed substances in applications such as fixed-bed dehumidifiers, tower dehumidifiers and rotary dehumidifiers. FIG. 10 shows the testing result of a dehumidifier. In FIG. 10, the desorption capability is 6.6 liter/day (20° C., 60% RH), desorption is achieved with convection heating with power consumption of 600 watts (as shown in FIG. 10). In other words, it takes 7854 J of energy to desorb 1 gram of water. When the dehumidification wheel is not rotating and a voltage is applied across the electrodes without convection heating, the power consumption is only 4200~4700 J/g. In FIG. 10, the longitudinal axis represents the weight reduction of the dehumidification wheel, indicating the amount of desorbed water, while the traversal axis represents time. Different curves represent the results of different experiments, each with different time. The values shown in FIG. 10 are measured power consumption values divided by the amount of desorbed water. In FIG. 10, with the electrodes being applied with a voltage, the power consumption is 45% reduced (dropping from 7854 J/g to 4200 J/g). Even though the values in FIG. 10 are obtained when the dehumidification wheel is not rotating, this method can be used in various applications such as tower dehumidifiers and rotary dehumidifiers with different electrode designs.

Accordingly, the present invention discloses a method and an apparatus for desorption and a dehumidifier using the method and the apparatus wherein a voltage is applied across electrodes on both ends of an absorbing material for desorption. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A dehumidifier, comprising:
   a condenser, capable of containing a circulating gas flow therein;
   a absorbing material, capable of allowing a gas flow to pass through to absorb moisture in the gas flow;
   a pair of electrodes, being disposed respectively on both sides of the absorbing material, each of the electrodes comprising a plurality of gas channels;
   a pair of insulators, being connected respectively to the pair of electrodes, each of the insulators comprising a plurality of insulating structures, each of the insulating structures corresponding to one of the gas channels respectively; and
   a regenerating portion, being disposed on one side of the absorbing material and being connected to the condenser, wherein the circulating gas flow is ionized by plasma in the regenerating portion so that the ionized circulating gas flow desorbs the moisture in the absorbing material.

2. The dehumidifier as recited in claim 1, wherein the condenser further comprises:
   a condenser plate, being connected to the regenerating portion and comprising a plurality of flowing paths therein to enable the circulating gas flow pass through; and
   a regenerating blower, connected to the condenser plate and the regenerating portion.

3. The dehumidifier as recited in claim 1, wherein each of the electrodes further comprises a plurality of holes as the plurality of gas channels.

4. The dehumidifier as recited in claim 1, wherein each of the electrodes further comprises a plurality of poles, each of the poles having one of the gas channels therein.

5. The dehumidifier as recited in claim 1, further comprising a heating unit, to increase the temperature of the circulating gas flow into the condenser plate.

6. The dehumidifier as recited in claim 1, wherein the absorbing material is a roller capable of rotating.

7. A regenerator for a dehumidifier, comprising:
   a pair of electrodes disposed a distance apart, each of the electrodes comprising a plurality of gas channels; and a pair of insulators, being respectively connected to the pair of electrodes, each of the insulators comprising a plurality of insulating structures, each of the insulating structures corresponding to one of the gas channels respectively.

8. The regenerator for a dehumidifier as recited in claim 7, wherein each of the electrodes further comprises a plurality of holes as the plurality of gas channels.

9. A low power consumption desorption method, comprising steps of:
    providing an absorbing material;
    providing electrodes on both ends of the absorbing material, each electrode comprising a plurality of gas channels;
    providing a pair of insulators, being respectively connected to the pair of electrodes, each of the insulators comprising a plurality of insulating structures, each of the insulating structures corresponding to one of the gas channels respectively; and
    applying a voltage across the electrodes on the both ends of the absorbing material so that the absorbing material is conductive to perform desorption.

10. The low power consumption desorption method as recited in claim 9, wherein the absorbing material is for dehumidification.

11. The low power consumption desorption method as recited in claim 9, wherein the absorbing material is capable of absorbing water.

12. The low power consumption desorption method as recited in claim 9, wherein the absorbing material is capable of absorbing organic volatile substances or nitrogen.

13. The low power consumption desorption method as recited in claim 9, further comprising a step of providing a gas flow through the absorbing material to carry substances desorbed from the absorbing material after applying the voltage.

14. The low power consumption desorption method as recited in claim 13, wherein the gas flow is a heated gas flow.

15. The low power consumption desorption method as recited in claim 9, wherein the voltage is an AC voltage or a DC voltage.

16. The low power consumption desorption method as recited in claim 9, wherein the absorbing material is porous.

17. The low power consumption desorption method as recited in claim 9, wherein the absorbing material is non-porous.

18. A low power consumption desorption apparatus, comprising:
    an absorbing material capable of absorbing at least a substance;
    a pair of electrodes disposed on both ends of the absorbing material, each electrode comprising a plurality of gas channels;
    a pair of insulators, being respectively connected to the pair of electrodes, each of the insulators comprising a plurality of insulating structures, each of the insulating structures corresponding to one of the gas channels respectively; and
    a voltage supply coupled to the pair of electrodes and providing the pair of electrodes with a voltage so that the absorbing material is conductive to perform desorption.

19. The low power consumption desorption apparatus as recited in claim 18, wherein the absorbing material is for dehumidification.

20. The low power consumption desorption apparatus as recited in claim 18, wherein the absorbing material is capable of absorbing water.

21. The low power consumption desorption apparatus as recited in claim 18, wherein the absorbing material is capable of absorbing organic volatile substances or nitrogen.

22. The low power consumption desorption apparatus as recited in claim 18, further comprising a blower for a step of providing a gas flow through the absorbing material to carry substances desorbed from the absorbing material after applying the voltage.

23. The low power consumption desorption apparatus as recited in claim 22, wherein the gas flow is directed to a heating unit for creating a heated gas flow.

24. The low power consumption desorption apparatus as recited in claim 18, wherein the voltage is an AC voltage or a DC voltage.

25. The low power consumption desorption apparatus as recited in claim 18, wherein the absorbing material is porous.

26. The low power consumption desorption apparatus as recited in claim 18, wherein the absorbing material is non-porous.

27. The low power consumption desorption apparatus as recited in claim 18, wherein each of the electrodes comprises:
    a meshed metal electrode; and
    a plurality of insulating frames disposed on the meshed metal electrode to divide the meshed metal electrode into a plurality of isolated electrodes.

28. The low power consumption desorption apparatus as recited in claim 27, wherein the plurality of isolated electrodes are desorptive.

29. The low power consumption desorption apparatus as recited in claim 18, further comprising a conductive layer between each of the electrodes and the absorbing material.

30. The low power consumption desorption apparatus as recited in claim 18, further comprising a gas flow channel disposed corresponding to the pair of electrodes.

31. The low power consumption desorption apparatus as recited in claim 18, capable of rotating.

32. The low power consumption desorption method as recited in claim 9, wherein the insulators are disposed on both ends of the absorbing material.

33. The low power consumption desorption method as recited in claim 9, wherein each of the insulators disposed in between the electrode and the absorbing material, at each side respectively.

34. The low power consumption desorption method as recited in claim 9, wherein the insulators disposed a distance apart from the absorbing material.

35. A low power consumption desorption apparatus as recited in claim 18, wherein the insulators are disposed on both ends of the absorbing material.

36. A low power consumption desorption apparatus as recited in claim 18, wherein each of the insulators disposed in between the electrode and the absorbing material, at each side respectively.

37. A low power consumption desorption apparatus as recited in claim 18, wherein the insulators disposed a distance apart from the absorbing material.

* * * * *